Patented Nov. 2, 1937

2,097,864

UNITED STATES PATENT OFFICE 2,097,864

PROCESS OF PREPARING AMINO-CARBOXYLIC ACIDS AND PRODUCTS OBTAINABLE THEREBY

Carl Platz, Frankfort-on-the-Main, and Hermann Holsten, Ludwigshafen-on-the-Rhine, Germany, assignors to General Aniline Works, Inc., New York, N. Y., a corporation of Delaware No Drawing. Application July 26, 1935, Serial No. 33,388. In Germany July 31, 1934

6 Claims. (Cl. 260—112)

This invention relates to a process of preparing amino-carboxylic acids and to products obtainable thereby.

We have found that high molecular amino-carboxylic acids of capillary action are obtainable in a technically simple manner by alkylating organic compounds containing primary or secondary amino groups and at least one aliphatic carbon chain with at least 6 carbon atoms or a cycloaliphatic or hydroaromatic radical having at least one side chain with at least 3 carbon atoms, the components being chosen so that the final product contains one or more carboxyl groups.

The compounds correspond with one of the following general formulae:

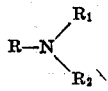

wherein R stands for an aliphatic radical with at least 6 carbon atoms or a cycloaliphatic or hydroaromatic radical having at least one side chain with at least 3 carbon atoms, $R_1$ and $R_2$ mean equal or different organic radicals, R or $R_1$ or $R_2$ being substituted by a carboxyl group or

wherein R stands for an aliphatic radical with at least 6 carbon atoms or a cycloaliphatic or hydroaromatic radical having at least one side chain with at least 3 carbon atoms, $R_1$ and $R_2$ mean equal or different organic radicals, R and $R_1$ or $R_1$ and $R_2$ being substituted by carboxyl groups.

In the present process there may be employed especially aliphatic, aliphatic-aromatic or cycloaliphatic primary or secondary amines, for instance, dodecylamine, methyldodecylamine, hydroxyethyl-oleylamine, dihydroxypropyldodecylamine, hexyloctylamine, dihexylamine. Furthermore, there may be used amino-mixtures which are obtainable from high-molecular natural fatty acids or their esters, such as palm-nut fatty acids, montanic acids, carboxylic acids obtainable by oxidation of paraffin, and hardened fish-oil fatty acid. Moreover, there may be used with advantage products of reaction from high-molecular alcohols, aldehydes, ketones or the like (for instance, the neutral reaction products obtainable by oxidation of paraffin) with ammonia or primary amines. Also hydroaromatic or cycloaliphatic amines, such as amines corresponding with abietic acid or the naphthenic acids, may advantageously be used as parent material. Suitable aromatic-aliphatic amines are, for instance, C-dodecylaniline or N-dodecylaniline. The said amines may also contain further substituents, for instance, hydroxyl- or nitro-groups or halogen atoms. Such amines are, for instance, glucamine, methylglucamine, dodecylglucamine, octodecylglucamine, alpha-aminolauric acid, alpha-aminostearic acid, alpha-methylamino-palmitic acid.

The present process is performed by using, so far as the said starting materials do not contain carboxyl groups or contain only an insufficient number thereof, carboxylic acids which are capable of reaction, especially aliphatic carboxylic acids, for instance, halogencarboxylic acids, monochloracetic acid, beta-chloropropionic acid, bromo-succinic acid. There is obtained, for instance, from methyldodecylamine and chloroacetic acid methyl-dodecylamino-acetic acid. By using a primary amine, for instance dodecylamine, the reaction may also be conducted so that both hydrogen atoms, bound to the nitrogen atom, are exchanged for the —CH$_2$—COOH— radical. In case the starting material contains already carboxyl groups, the hydrogen atom, bound to the nitrogen atom, is caused to react with suitable compounds.

For this purpose there may be mentioned: methyl chloride, ethyl chloride, sodium butyl sulfate, ethylene oxide, propylene oxide, cyanic acid, carbon bisulfide, polyglycol, polyglycerine, chlorethane-sulfonic acid, benzyl chloride-sulfonic acid, bromobenzene or the like.

The products obtainable by the present invention are in the form of their alkali salts being powders having a greasy feel, some of which are hygroscopic. They dissolve easily even in cold water, are very resistant towards the salts that cause the hardness of the water and dissolve in dilute acids, especially in hot dilute acids, such as glacial acetic acid and hydrochloric acid. They may advantageously be used as agents for wetting, washing, cleansing and dispersing in the textile, leather, paper and other industries; especially they may advantageously be used for all cleansing purposes, for washing wool as well as for washing cotton, for instance, white linen goods. They are especially adapted as assistants for dye-baths, in which they improve in many cases the solubility or the dispersion of the dye-stuffs, so that a good through-dyeing and levelling is obtained. The products described may be used advantageously also for after-soaping as well as for improving the fastness to rubbing of many prints. Furthermore, they are suitable as resists and as assistants in printing pastes; in mercerization and bucking lyes for fulling and as softening agents for textile goods.

The products may be used either alone or in admixture with one another or with other usual wetting, washing, dispersing agents and the like, for instance, Turkey red oils, sulfuric acid esters of high-molecular aliphatic alcohols, true sulfonic acids of high-molecular aliphatic or aromatic compounds, for instance products of reaction of fatty acids with hydroxyalkyl- or aminoalkyl-sulfonic acids. Furthermore, they may be used in admixture with solvents, such as carbon tetrachloride, cyclohexanol, benzyl alcohol, glycolic ether and the like as well as together with salts, for instance, Glauber's salt (sodium sulfate), perborates, water-glass, sodium carbonate or with protective colloids, such as glue, gelatin, dextrin, tragacanth.

The following examples serve to illustrate the invention, but they are not intended to limit it thereto; the parts are by weight:

(1) 199 parts of methyldodecylamine are added to an aqueous solution of sodium monochloracetate prepared at 20° C. from 100 parts of monochloracetic acid and 43 parts of caustic soda in about 1000 parts of water. The whole is then heated to boiling temperature while stirring continuously, the formation of layers completely disappearing after about 1½ hours. The methyldodecylamino-acetic acid is obtained in a quantitative yield; in the form of its sodium salt it dissolves easily in water. The product remains stable in water containing per liter 200 mg. of CaO and 143 mg. of MgO, respectively, and may be used as softening agent for artificial silk, for instance, in the form of an aqueous solution of 0.2 per cent. strength. It corresponds with the formula:

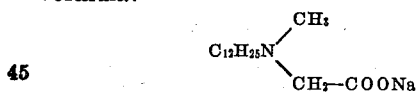

(2) To 281 parts of methyloleylamine there is added at 90° C. an aqueous solution of sodium monochloracetate, prepared at room temperature from 110 parts of monochloracetic acid and 48 parts of caustic soda in 1000 parts of water. The whole is warmed while stirring, finally in an oil bath for about 2 hours up to 100° C. whereby a greyish-green gelatinous mass is formed which, after further addition of 40 parts of caustic soda (dissolved in 100 parts of water) becomes thinly liquid and assumes a light-yellow color. The sodium salt of methyloleylamino-acetic acid thus formed is easily soluble in water. The product may be used as fulling agent.

It corresponds with the following formula:

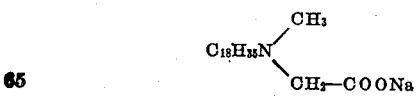

(3) An aqueous solution of 265 parts of sodium dodecylamino-acetate is added to an aqueous solution of sodium monochloracetate, prepared at 20° C. from 94.5 parts of monochloracetic acid and 40 parts of caustic soda in 1000 parts of water. The whole is gradually heated, while stirring, to boiling temperature. After 2 hours, the reaction is finished; the dodecylaminodiacetic acid is obtained in the form of its sodium salt.

The compound is easily soluble in water; it corresponds with the following formula:

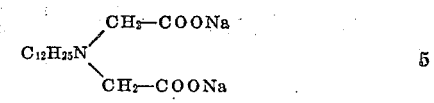

In order to isolate the free acid, hydrochloric acid is added to the aqueous solution of the sodium salt until it is distinctly acid to Congo paper; it is then rendered acid to litmus paper by means of sodium acetate solution. The dodecylaminodiacetic acid is precipitated quantitatively in the form of a colorless precipitate which is filtered and dried. The acid crystallizes readily and may easily be recrystallized from alcohol. It sinters at 135° C. to 137° C. and decomposes at 172° C. to 175° C.

(4) 120 parts of sodium dodecylamino-acetate are suspended in 1000 parts of water, and, at 60° C. to 65° C., a slow current of 20 parts of ethylene oxide is introduced while stirring gently. After about 15–20 minutes, the ethylene oxide has been taken up and dissolution has occurred. The whole is then evaporated to dryness; by recrystallization from alcohol the pure sodium hydroxyethyldodecylamino-acetate is obtained. In comparison with the parent material it is distinguished by a greater solubility and a greater stability towards salts that cause the hardness of water. The product is very well adapted for washing white linen goods; it corresponds with the formula:

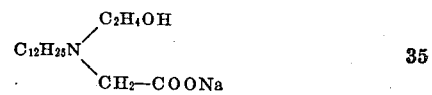

(5) To 230 parts of hydroxyethyldodecylamine there is added at 0° C. a concentrated solution which has been prepared in the cold and contains 110 parts of sodium monochloracetate. The temperature is then gradually raised to 55° C. to 60° C., the whole is stirred at this temperature for 1½–2 hours and thereupon the temperature is maintained for ½ hour at 90° C. to 95° C. A product is obtained which has the same properties as those of the product obtained as described in Example 4. It corresponds to the following formula:

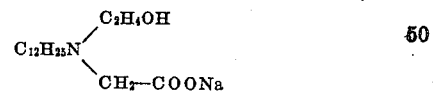

(6) To a solution of 200 parts of monochloracetic acid in 500 parts of water, there is added, while cooling with ice, such an amount of concentrated caustic soda solution as is sufficient to render the solution feebly alkaline to phenolphthalein. Thereupon, 90 parts of dodecylamine are added and the whole is stirred for about 4 hours at 80° C.; during this time, by adding caustic soda solution, care is taken that the mixture remains alkaline. The solution is then diluted with 1000 parts of water and 500 parts of concentrated hydrochloric acid are added. On cooling, the product crystallizes; it is filtered by suction. The product corresponds to the following formula:

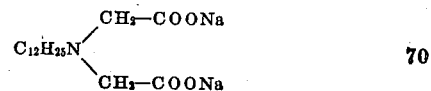

(7) A solution of 129 parts of caustic soda solution of 40° Bé. in 100 parts of ice is added to a solution of 104 parts of chloracetic acid in 100 parts of water; 273 parts of monohydroxyethyllorolamine (the mixture of bases, prepared by reduction from the nitrile of palm nut oil fatty acid, which has been treated with 1 mol. of ethyleneoxide per 1 atom of nitrogen) are added, the whole is heated for some hours at 40° C. to 50° C. and then for one hour at 60° C. to 70° C. whereupon the whole is concentrated.

The product obtained may be treated with sulfonating agents in the following manner: 200 parts of the pasty mass, obtainable according to the before-mentioned manner, are kneaded with 200 parts of sulfuric acid monohydrate. The product is taken up in a small quantity of ice water and neutralized with caustic soda solution whereby at first the mother liquor which contains hydrochloric acid and sulfuric acid separates. The remaining balsam-like matter is completely neutralized or rendered feebly alkaline until a clear solution in water is obtained. In alkaline solution the product is entirely stable against the salts that cause the hardness of water and has a strong foaming and washing power, but precipitates, on acidification, owing to the formation of an inner, sparingly soluble, sulfonic acid salt. Hence, the product is very well adapted for being used in alkaline media as agent of capillary action, especially for washing white linen goods. It is of particular advantage to use it in hard water, no precipitates of inorganic salts being formed which might interfere to any considerable extent.

Instead of effecting the sulfonation with sulfuric acid monohydrate there may also be used a considerably smaller quantity of chlorosulfonic acid, if necessary by simultaneously using an inert solvent.

(8) 275 parts of an amine of the iodine number 67, obtained from hardened fish oil fatty acid by way of the nitrile and reduction of the nitrile to the amine, are heated to 80° C. In the course of half-an-hour a solution of sodium beta-chloropropionate is run in, while stirring continuously. Care must be taken that the reaction is always alkaline to phenolphthalein. The reaction is finished as soon as a test portion in an alkaline medium dissolves in water to a clear solution. The reaction product is then filled into an enamel bomb whereupon 55 parts of chloromethyl are pressed in. The whole is heated, while stirring, to 80° C. whereby a pressure of about 4 to 6 atmospheres is attained. As soon as the pressure has disappeared, stirring is continued for 2 hours at 80° C. After cooling, the reaction product is distinctly alkaline to phenolphthalein. It may be used in this form for various technical purposes.

We claim:

1. The process of preparing tertiary amino compounds which comprises alkylating at the nitrogen atom an organic amino compound of the general formula:

$R_1$ being a member of the group consisting of hydrogen, aliphatic hydrocarbon radicals, aliphatic hydrocarbon radicals containing hydroxyl, aliphatic hydrocarbon radicals containing carboxyl, aromatic hydrocarbon radicals, $R_2$ standing for a member of the group consisting of aliphatic hydrocarbon radicals of at least 6 carbon atoms, cycloaliphatic hydrocarbon radicals having at least one side chain with at least 3 carbon atoms and hydroaromatic hydrocarbon radicals having at least one side chain with at least 3 carbon atoms, the components taking part in the reaction being chosen so that the final product contains at least one carboxyl group.

2. The process of preparing tertiary amino compounds which comprises alkylating at the nitrogen atom an organic amino compound of the general formula:

$R_1$ being a member of the group consisting of hydrogen and aliphatic hydrocarbon radicals, $R_2$ standing for an aliphatic hydrocarbon radical of at least 6 carbon atoms, the components taking part in the reaction being chosen so that the final product contains at least one carboxyl group.

3. The process of preparing tertiary amino compounds which comprises reacting an organic amino compound of the general formula:

$R_1$ being an aliphatic hydrocarbon radical substituted by a carboxyl group, $R_2$ standing for an aliphatic hydrocarbon radical of at least 6 carbon atoms, with an organic compound capable of substituting the hydrogen linked to the nitrogen atom.

4. The process of preparing tertiary amino compounds which comprises reacting a halogenated aliphatic carboxylic acid with an organic amino compound of the general formula:

$R_1$ being a member of the group consisting of hydrogen, aliphatic hydrocarbon radicals, aliphatic hydrocarbon radicals containing hydroxyl, aliphatic hydrocarbon radicals containing carboxyl, aromatic hydrocarbon radicals, $R_2$ standing for an aliphatic hydrocarbon radical of at least 6 carbon atoms.

5. The new products of the general formula:

wherein R stands for a member of the group consisting of aliphatic hydrocarbon radicals of at least 6 carbon atoms, cycloaliphatic hydrocarbon radicals having at least one side chain with at least 3 carbon atoms and hydroaromatic hydrocarbon radicals having at least one side chain with at least 3 carbon atoms, $R_1$ stands for an aliphatic hydrocarbon radical containing COOH, $R_2$ stands for a member of the group consisting of aliphatic hydrocarbon radicals, aliphatic hydrocarbon radicals containing hydroxyl, aliphatic hydrocarbon radicals containing carboxyl and aromatic hydrocarbon radicals, in the form of their alkali salts being powders having a greasy feel, dissolving easily even in cold water, being very resistant towards the salts that cause the hardness of water and dissolving in dilute acids, especially in hot dilute acids.

6. The new products of the formula:

wherein R stands for an aliphatic hydrocarbon radical with at least 6 carbon atoms, $R_1$ and $R_2$ stand for an aliphatic hydrocarbon radical substituted by COOH, in the form of their alkali salts being powders having a greasy feel, dissolving easily even in cold water, being very resistant towards the salts that cause the hardness of water and dissolving in dilute acids, especially in hot dilute acids.

CARL PLATZ.
HERMANN HOLSTEN.